United States Patent
Miyamae et al.

(10) Patent No.: US 6,174,223 B1
(45) Date of Patent: Jan. 16, 2001

(54) METHOD AND APPARATUS FOR POLISHING EXTERNAL-TOOTH GEARS

(75) Inventors: Kazuhiro Miyamae, Ohbu; Kiyoji Minegishi, Chita-gun; Takashi Toida; Tetsuzo Ishikawa, both of Ohbu, all of (JP)

(73) Assignee: Sumitomo Heavy Industries, Ltd., Tokyo (JP)

( * ) Notice: Under 35 U.S.C. 154(b), the term of this patent shall be extended for 0 days.

(21) Appl. No.: 09/481,569

(22) Filed: Jan. 11, 2000

(30) Foreign Application Priority Data

Jan. 14, 1999 (JP) .................................................. 11-008021

(51) Int. Cl.$^7$ ....................................................... B24B 1/00

(52) U.S. Cl. ............................. 451/47; 451/296; 451/303

(58) Field of Search ................................ 451/47, 48, 296, 451/303, 28, 59, 307

(56) References Cited

U.S. PATENT DOCUMENTS

| 4,744,179 | * | 5/1988 | Mockli | 451/47 |
| 4,920,703 | * | 5/1990 | Hosoya | 451/47 |
| 5,928,068 | * | 7/1999 | Matsuda et al. | 451/303 |

* cited by examiner

Primary Examiner—Derris H. Banks
(74) Attorney, Agent, or Firm—Arent, Fox, Kintner, Plotkin & Kahn PLLC

(57) ABSTRACT

There is provided a method and an apparatus for improving surface roughness of tooth surfaces of an external-tooth gear (W), and thereby reducing the occurrence of noises associated with the meshing between teeth. In accordance with the method, teeth of the external-tooth gear (W) are polished by rotating teeth of the external-tooth gear (W) relative to a film polishing member (110) in the tooth profile direction, and simultaneously by oscillating the external-tooth gear (W) in the tooth trace direction, while pressing the film polishing member (110) against tooth surfaces of the external-tooth gear W by backing up with a shoe (120).

7 Claims, 6 Drawing Sheets

METHOD AND APPARATUS FOR POLISHING EXTERNAL-TOOTH GEARS

BACKGROUND OF THE INVENTION

1. Field of the Invention

The present invention relates to a method and an apparatus for polishing an external-tooth gear which is inscribed and meshed with an internal-tooth gear inside the internal-tooth gear, and in particular to a method and an apparatus suitable for polishing tooth surfaces of the external-tooth gear used for gearing such that the center of the internal-tooth gear lies inside the periphery of external-tooth gear.

2. Detailed Description of the Prior Art

It is widely known in the prior art, that there is provided a gearing (gearing corresponding to International Patent Classification F16H 1/32) which has an external-tooth gear that is inscribed and meshed with an internal-tooth gear inside the internal-tooth gear, and in which the center of the internal-tooth gear lies inside the periphery of external-tooth gear.

As a typical example of the gearing of this type, there is an inscribed meshing planetary gear construction comprising: a first shaft; an eccentric body which is rotated by the rotation of the first shaft; a plurality of external-tooth gears which are attached eccentrically rotatably to the eccentric bodies through bearings; an internal-tooth gear with which the external-tooth gears are inscribed and meshed through internal teeth composed of outer pins; and an second shaft which is connected to the external-tooth gears through inner pins for only the rotational component of the external-tooth gears.

An example of the prior art of this construction is illustrated in FIGS. 7 and 8. This example applies above-described construction to a "speed reduction gear" by using the first shaft as an input shaft and using the second shaft as an output shaft and at the same time by fixing the internal-tooth gear.

Eccentric bodies 3a and 3b are fitted to the input shaft 1 with a predetermined phase difference (180 degree in this case). The eccentric bodies 3a and 3b (center: O2) are decentered respectively relative to the input shaft 1 (center: O1) by an eccentricity e. Two external-tooth gears 5a and 5b are attached to each of these eccentric bodies 3a and 3b in plural rows through bearings 4a and 4b. A plurality of inner-roller holes 6a and 6b are provided in the external-tooth gears 5a and 5b. In these inner-roller holes 6a and 6b, inner pins 7 and inner rollers 8 are fitted.

A main object of providing two external-tooth gears (in plural rows) is to increase a transmission capacity, maintain a strength and retain a rotation balance.

External teeth 9 such as trochoid teeth or arcuate teeth are provided on the outer circumferences of the external-tooth gears 5a and 5b. The external teeth 9 are inscribed and meshed with the internal-tooth gear 20 fixed to a casing 12. The internal-tooth gear 20 consists of a pin retaining ring 10 and outer pins 11. The pin retaining ring 10 has a plurality of semicircular pin retaining holes 13 disposed along the inner circumference of the inner-tooth gear in an axial direction thereof. The outer pins 11 are fitted to the pin retaining holes 13 so as to easily rotate with a play and which form arcuate tooth profiles at the parts where the outer pins project from the pin retaining holes 13.

The inner pins 7 passing through the external-tooth gears 5a and 5b are fixed securely to or fitted into a flange part around the output shaft 2.

When the input shaft 1 rotates once, the eccentric bodies 3a and 3b are also rotated once. In response to this one revolution of the eccentric bodies 3a and 3b, the external-tooth gears 5a and 5b try to make an oscillatory rotation around the input shaft 1. However, since the rotation is restricted by the internal-tooth gear 20, the external-tooth gears 5a and 5b almost merely perform oscillation while being inscribed with the internal-tooth gear 20.

Now, if it is assumed that the number of teeth of the external-tooth gears 5a and 5b is N, and the number of teeth of the internal-tooth gears 20 is N+1, then the difference between their numbers of teeth is 1. Hence, the external-tooth gears 5a and 5b are displaced (rotates) by one tooth relative to the internal-tooth gear 20 fixed to the casing 12 every time the input shaft 1 is rotated once. This means that one revolution of the input shaft 1 is decelerated to a revolution of −1/N of the external-tooth gear 5a and 5b.

Oscillatory component of the revolution of the external-tooth gears 5a and 5b is absorbed by clearance between the inner-roller holes 6a and 6b and the inner pins 7 (inner rollers 8), and thereby only the rotational component is transmitted to the output shaft 2 through the inner pins 7.

Eventually, speed reduction in a reduction ratio −1/N (minus denotes reverse rotation) is attained.

At present, this inscribed meshing planetary gear construction is applied to various speed reduction gears or increasing gears. In the above-described construction of the prior art, the first shaft is used as an input shaft and the second shaft is used as an output shaft, with the internal-tooth gear fixed. However, for example, a reduction gear can also be constructed by using the first shaft as an input shaft and the internal-tooth gear as an output shaft, as well as by fixing the second shaft. Furthermore, a "speed increase gear" can also be constructed by reversing these input shaft and output shaft in such a construction.

Now, in order to downsize an inscribed meshing planetary gear mechanism of this type and provide it with a high load carrying capacity, this mechanism must be manufactured so that, among components having meshing parts and sliding parts, the internal-tooth gear 20 has a high strength property, and the external-tooth gears 5a and 5b, outer pins 11, inner rollers 8, inner pins 7, bearings 4a and 4b, and eccentric bodies 3a and 3b have a high strength property as well as a high hardness. Therefore, above-described components are usually made of metallic materials having such properties.

However, since metallic materials having a high strength property and a high hardness property have comparatively high coefficients of friction, sliding contact surfaces comprised of these metallic materials must be lubricated with oil or grease. Since the lubrication is thus executed by forming oil or grease film between contact surfaces, clearances for that purpose must be provided between contact surfaces of transmission mechanism.

Such clearances, however, cause a play or backlash, with the result that a rotation on one side does not appear immediately as a rotation on the other side. Such a delay of response is called an angular backlash hereafter.

When a gearing is used as a position control mechanism associated with forward and backward rotations such as a joint of industrial robot, such an angular backlash causes the reduction in the control accuracy of the control mechanism, and hence the clearances must be reduced in order to eliminate the angular backlashes. In terms of the retention of lubricating oil, however, reduction in clearances is undesirable. Eventually, the reduction in an angular backlash and an improvement in lubricating performance are mutually contradictory elements.

On the other hand, it is also known that there is a technique of forming conversion coatings such as phosphate films on sliding parts and thereby decreasing frictional coefficients at the sliding surfaces. However, this reduction in frictional coefficients is not attributable to these conversion coatings themselves, but attributable to a lot of lubricating oil retained in minute irregularities.

Although formation of the above-described known conversion coatings on meshing sliding surfaces of transmission mechanism may be considered as one of possible means for reducing frictional coefficients, conversion coatings themselves have a drawback of easily wearing and peeling off in a short period of time.

Japanese Patent Application No.Sho 60-271649 (Japanese Patent Publication No.Hei 2-36825; Japanese Patent No. 1623717) proposes contact surfaces which are formed with irregular surfaces in the tooth trace direction of grinding marks on tooth profiles and in the direction perpendicular to the tooth trace direction of grinding marks (the tooth profile direction), and which are covered with conversion coatings of less thicknesses than the heights of the irregularities. These are aimed to provide construction of contact surfaces such as to allow the clearances between contact surfaces in transmission mechanism to be narrowed and at the same time allow lubricating oil to be retained for a long period of time, and to provide a method for producing such contact surfaces.

However, all of these known methods are intended to achieve a high efficiency and a long durable life by reducing frictional coefficients at the contact surfaces between the tooth profiles of external-tooth gears and an internal-tooth gear through the presence (retention) of lubricating oil; i.e., these known methods are not based on the philosophy of smoothing contact surfaces. In view of the situations that the conversion coatings themselves do not particularly provide low frictional coefficients and it is the retention of lubricating oil between coatings having irregularities which provides low frictional coefficients, the known methods have the idea that too smooth contact surfaces can not retain lubricating oil. In reality, contact surfaces in the known methods are not always provided with good surface roughness.

As described above, since the main purpose of the conventional transmission mechanism is to decrease friction coefficients by the retention of lubricating oil, no active efforts are put into improving surface roughness of tooth surfaces (contact surfaces). This creates a problem that sliding noises and rolling noises are caused by the roughness of contact surfaces when meshing parts of the external-tooth gears and the outer pins of internal-tooth gear are under a rolling contact accompanied with sliding. Furthermore, since heavier sliding noises occur for such a reason, it is difficult to make smaller than now the clearance between the external-tooth gear and internal-tooth gear, which resulted in an increase in angular backlash described before.

SUMMARY OF THE INVENTION

Accordingly, it is an object of the present invention to provide a method for polishing external-tooth gears which can contribute to the reduction in noises associated with the meshing of teeth of the external-tooth gear, in which seizures at contact parts can be prevented by so-called fluid lubrication, and in which an angular backlash can also be reduced. It is another object of the present invention is to provide a polishing apparatus used for executing the above polishing method in accordance with the present invention.

The present invention resolves the above-described problems by a method for polishing external-tooth gear, wherein teeth of the external-tooth gear and a film polishing member are made to slide relative to each other in the tooth profile direction (the direction in which teeth are aligned, i.e., the circumferential direction of external-tooth gear), while the film polishing member is pressed against tooth surfaces of the external-tooth gear by backing up with a pressing member.

Typically, the external-tooth gear of oscillatory inscribed meshing construction of this type, including tooth bottom portions, provides smooth tooth profiles such as arcuate tooth profiles or trochoid tooth profiles. In accordance with the present invention, it is possible to enhance the smoothness of tooth surfaces by reducing their waviness and roughness in the tooth profile direction of tooth surfaces. This suppresses the occurrence of sliding noises and rolling noises at rolling contact accompanied with sliding due to the meshing between teeth. This is a very significant property as a property required of the oscillatory inscribed meshing construction of this type.

Reduction of surface roughness also allows the realization of fluid lubrication between contact surfaces. This, in turn, enables the gap between teeth to be narrowed without a threat of seizure, and further enables wobbling noises as well as angular backlash to be reduced.

The press polishing in the tooth profile direction using the film polishing member may be executed after teeth of the external-tooth gear have been polished in the tooth trace direction with a formed grindstone. This permits a more efficient polishing.

Furthermore, when executing the press polishing in the tooth profile direction using the film polishing member, teeth of the external-tooth gear may be vibrated relative to the film polishing member in the tooth trace direction. This leads to a further improvement in surface roughness.

Moreover, the pressing surface of pressing member may be formed into a convex curved surface having a smaller curvature than that of the concave curved surface of a tooth profile of the external-tooth gear, and the film polishing member may be pressed against tooth surfaces of the external-tooth gear through that convex curved surface. This allows an efficient polishing of tooth surfaces, especially those of valley parts of teeth.

In addition, by making the film polishing member capable of advancing and retreating in the radial direction relative to the center of axis of the external-tooth gear and by rotating the external-tooth gear about the center of axis thereof, teeth of the external-tooth gear to be polished may be made to slide relative to the film polishing member in the tooth profile direction.

As described above, since a tooth profile of the external-tooth gear of this type is, including tooth bottom part, formed of smooth curve such as an arcuate tooth profile or a trochoid tooth profile, rotation of the teeth permits the tooth surfaces along tooth profile curves to be polished with reliability in the tooth profile direction.

As film polishing member, it is preferable to use polyester films coated with a particulate abrasives such as aluminum oxide, silicon carbide and diamond.

On the other hand, the present invention resolves the above-described problems by an apparatus for polishing external-tooth gear, comprising: a film polishing member for polishing tooth surfaces of the external-tooth gear; a pressing mechanism which has a pressing member capable of advancing and retreating relative to the center of axis of the external-tooth gear in the radial direction, and which presses the film polishing member against tooth surfaces of the gear with a predetermined pressure through the pressing member; and a polishing drive mechanism for making slide teeth of the gear relative to the film polishing member in the tooth profile direction.

As means for pressing the film polishing member against tooth surfaces with a predetermined pressure, for example, a pneumatic cylinder mechanism may be used.

As a polishing drive mechanism, a film advance unit for advancing (pulling) long lengths of film polishing member in the longitudinal direction, and a gear rotation unit for supporting and rotating an external-tooth gear as work may be utilized. When driving an external-tooth gear, a minute reciprocative rotational drive can be easily achieved in both the directions of tooth trace and tooth profile, and thereby a polishing effect by reciprocating sliding can be more enhanced.

In addition, provision of an oscillation mechanism for oscillating teeth of the external-tooth gear relative to the film polishing member in the tooth trace direction, can enhance a polishing effect even further.

BRIEF DESCRIPTION OF THE DRAWINGS

The above and other objects, features and advantages of the present invention will be apparent from the following detailed description of the preferred embodiment of the invention in conjunction with the accompanying drawings, in which.

DETAILED DESCRIPTION OF THE PREFERRED EMBODIMENTS

An embodiment of the present invention will be described hereinafter with reference to the accompanying drawings.

Figure 1:
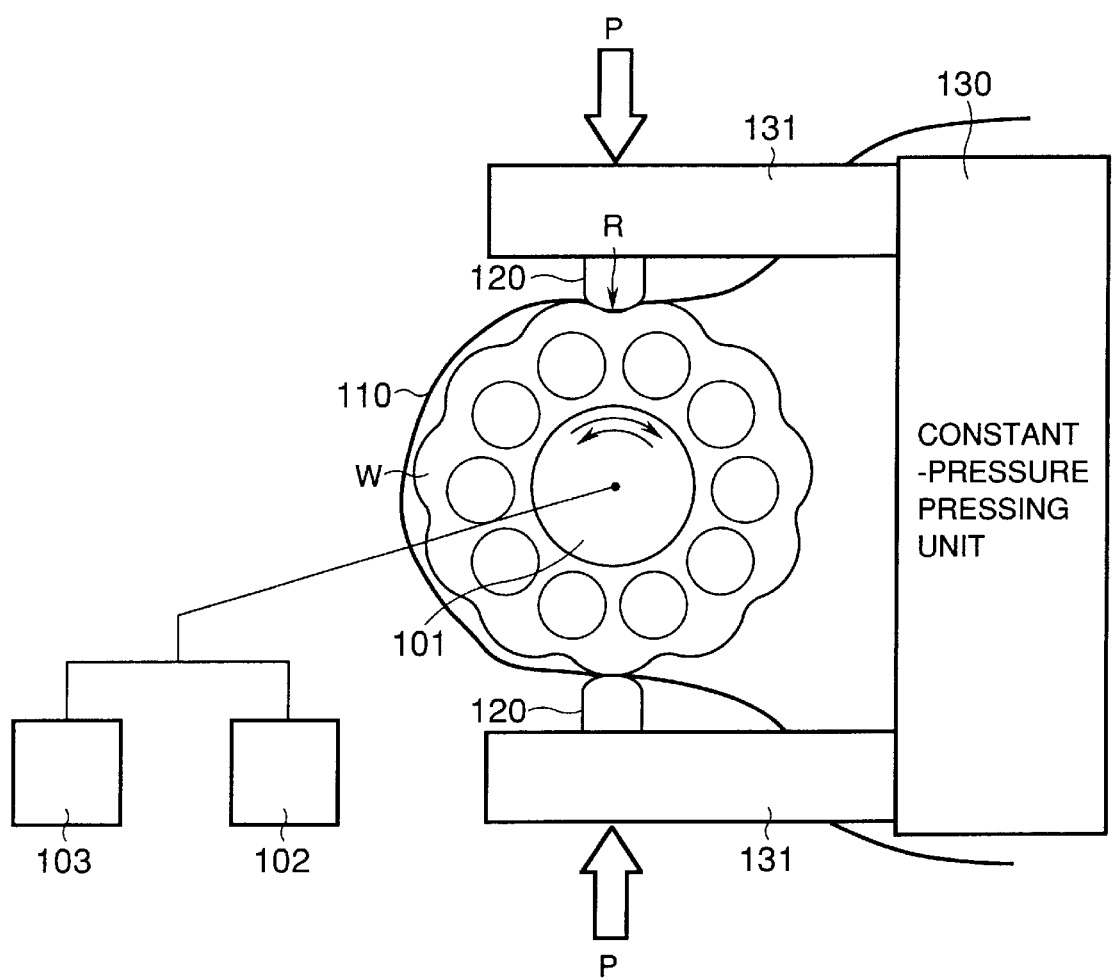
FIG. 1 is a schematic block diagram showing a polishing apparatus in accordance with a preferred embodiment of the present invention.
Figure 2:
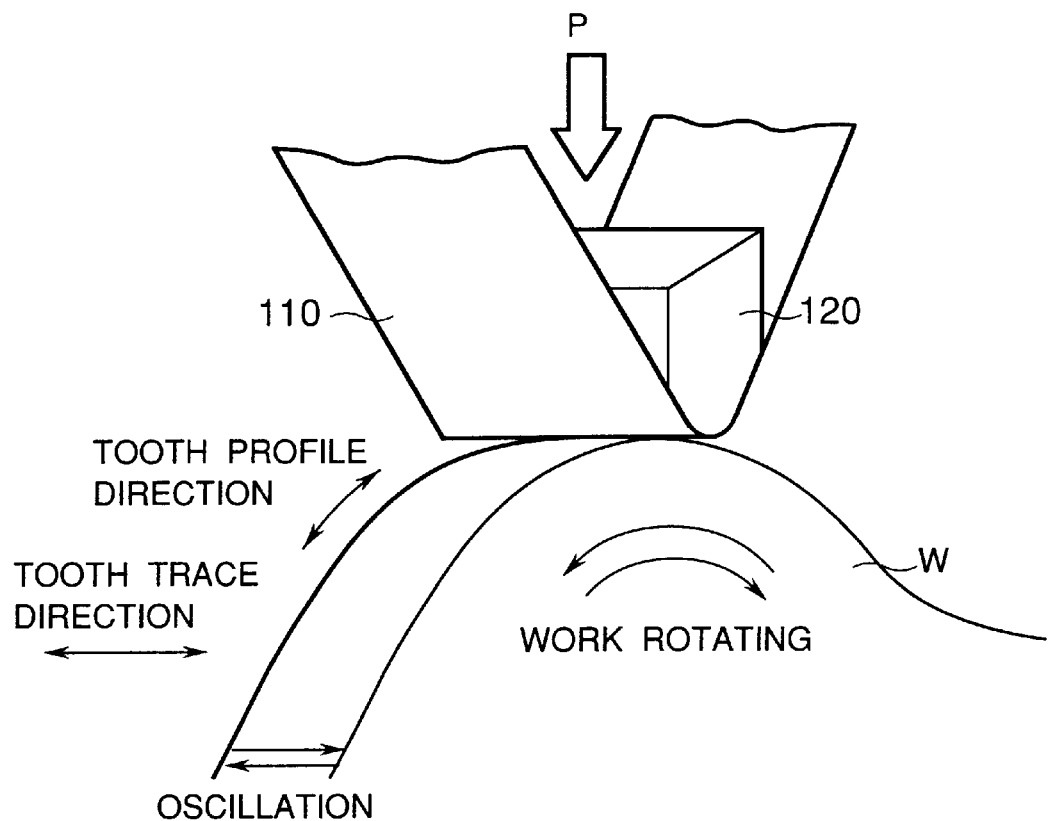
FIG. 2 is an enlarged view of the critical portion in FIG. 1.

FIG. 1 shows a schematic block diagram of a polishing apparatus for executing the polishing method in accordance with the present invention, and FIG. 2 shows the critical portion in FIG. 1 in an enlarged form.

Figure 7:
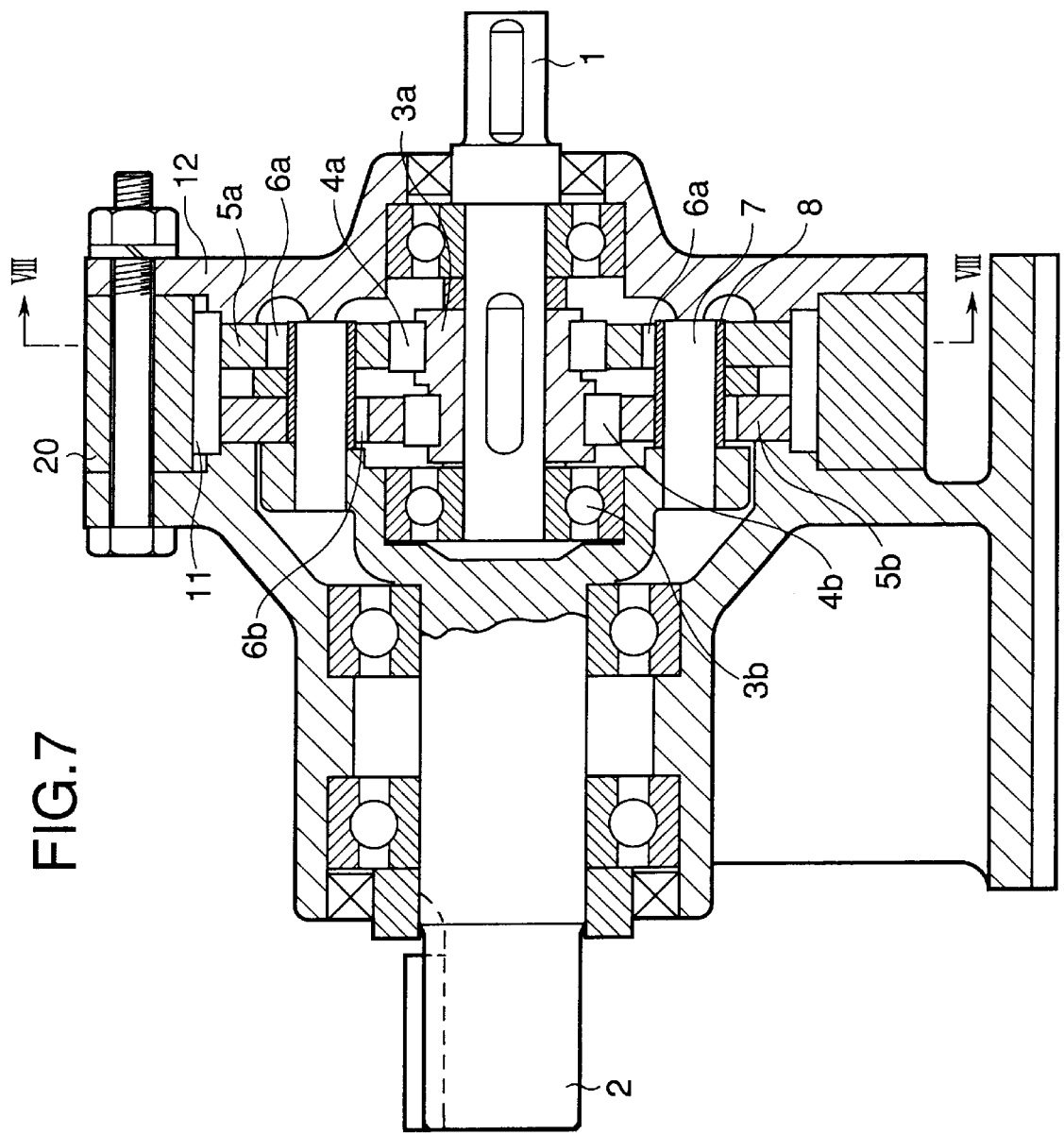
FIG. 7 is a cross sectional view of an inscribed meshing planetary gear mechanism including work to be polished in accordance with the present invention.
Figure 8:
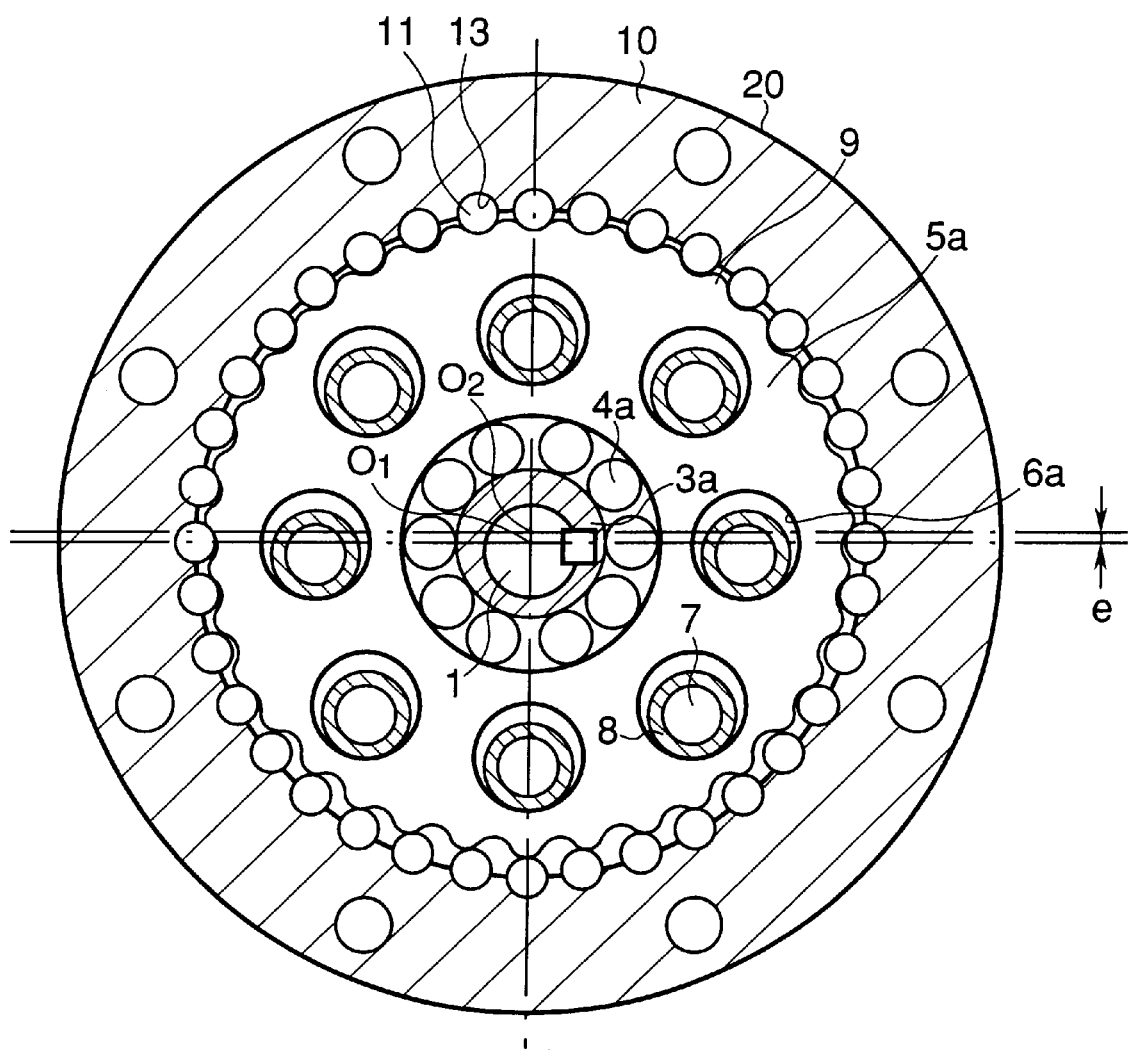
FIG. 8 is a cross-sectional view taken along a line VIII—VIII of FIG. 7.

Here, work to be polished is an external-tooth gear W of the same kind as external-tooth gears 5*a* and 5*b* of the inscribed meshing planetary gear mechanism shown in FIGS. 7 and 8.

This external-tooth gear W has trochoid tooth profiles on the periphery thereof, and is supported on a horizontal driving shaft 101. The driving shaft 101 is adapted to be reciprocatively rotated in the tooth profile direction (the circumferential direction of the external-tooth gear W: see FIG. 2) while supporting the external-tooth gear W, and simultaneously to be minutely vibrated (oscillated) in the tooth trace direction (the axial direction of the external-tooth gear W: see FIG. 2). In FIG. 1, referential numeral 102 denotes a rotational driving unit (polishing drive mechanism) for rotating the driving shaft, and 103 denotes an oscillation unit for minutely vibrating the driving shaft.

A film polishing member 110 for polishing tooth surfaces of the external-tooth gear W is laid on the periphery of the external-tooth gear W supported on the driving shaft 101 so that the film polishing member 110 covers approximately a half of the periphery of the external-tooth gear W.

Figure 3:
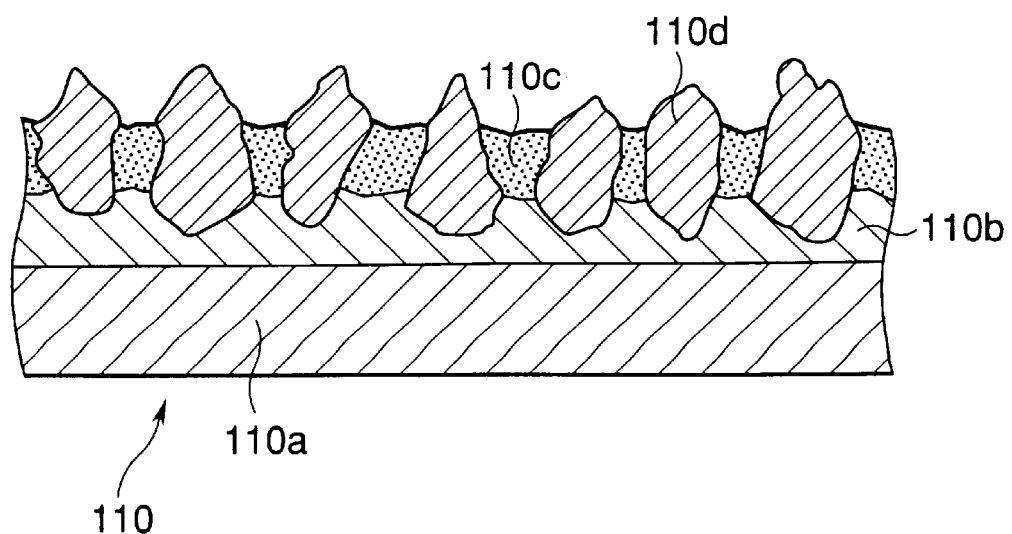
FIG. 3 is an enlarged sectional view of a film polishing member used in the present polishing apparatus.

The film polishing member 110 is, as its cross section is shown in FIG. 3, one composed of a polyester film 110*a* of which surface is coated with abrasive particles (fine particulate abrasives) 110*d* such as aluminum oxide, silicon carbide and diamond using thermosetting adhesives 110*b* and 110*c*. The side on which parts of the abrasive particles 110*d* are exposed is the polishing side.

Returning to FIG. 1, provided above and below the external-tooth gear W, are shoes 120 as pressing members in the pressing mechanism for pressing the film polishing member 110 against tooth surfaces of the external-tooth gear W. The shoes 120 are supported on arms 131 of a constant-pressure pressing unit 130 incorporating a pneumatic cylinder mechanism and the like, and serve as a backing up member for pressing the film polishing member 110 against tooth surfaces of the external-tooth gear W with a constant pressure P.

The pressing surface of each of these shoes 120 is formed into a convex curved surface having a smaller curvature than that of the concave curved surface of a trochoid tooth profile (a curved surface having a curvature R to such an extent as to follow tooth surfaces of the external-tooth gear W as the gear is rotated), so that the convex surface is capable of polishing valley parts of teeth reliably and efficiently by pressing the film polishing member 110 against tooth surfaces.

As other units, there are provided a polishing control unit for controlling the rotational driving unit 102 and the oscillation unit 103, a film advance unit for advancing (pulling) the film polishing member 110 and a control unit for the constant-pressure pressing unit 130 (any of these not shown).

Now, a method for finishing teeth of the external-tooth gear W will be described.

The process of tooth finish consists of two steps; a first step is to perform a grinding operation by means of a grindstone, and a second step is to carry out a polishing operation using the above-described polishing apparatus.

Figure 4:
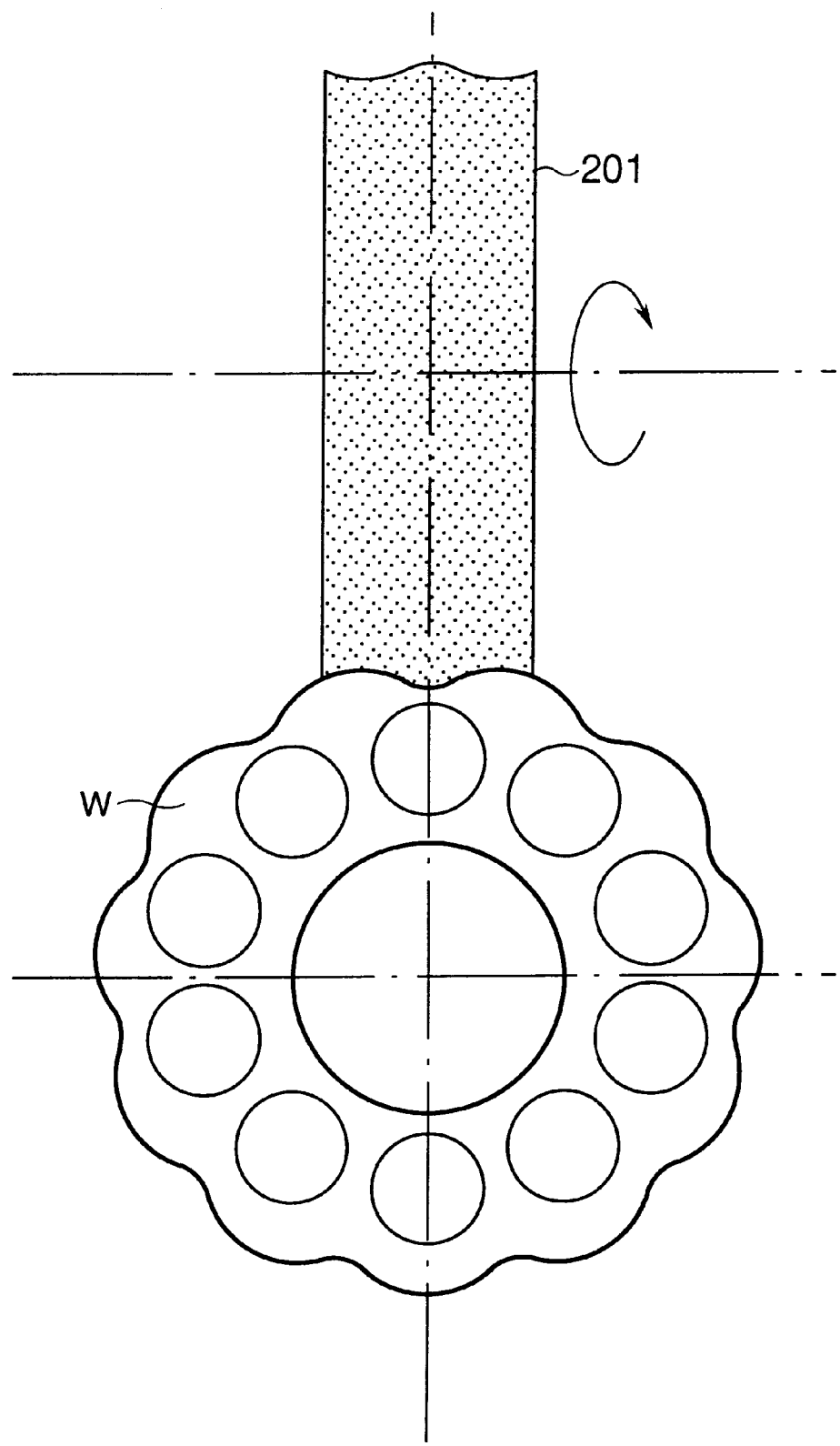
FIG. 4 is a schematic representation for explaining grinding operation conducted in the step prior to the execution of the polishing method in accordance with the preferred embodiment of the present invention.
Figure 5:
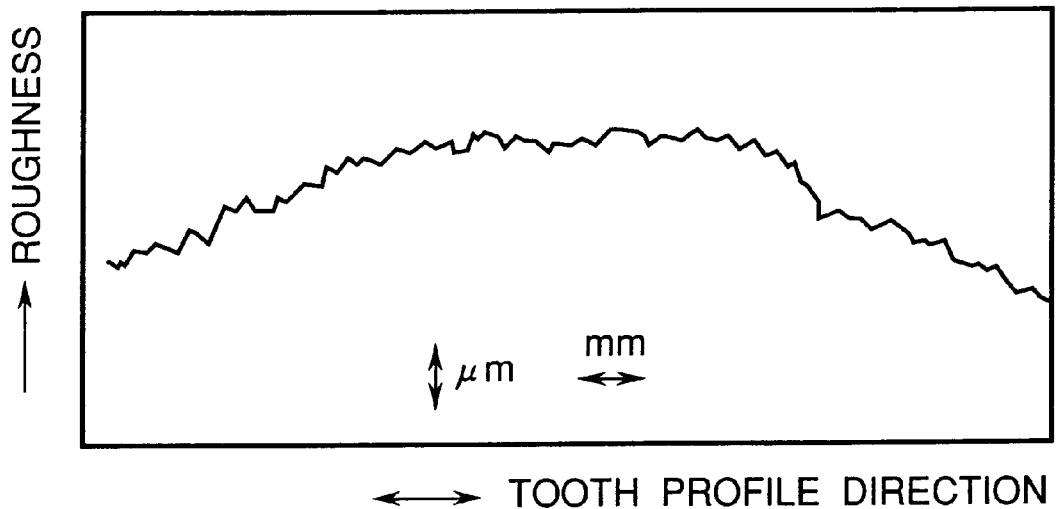
FIG. 5 is a characteristic view of roughness data of a work surface before executing the polishing method in accordance of the present invention.

In the first step, as illustrated in FIG. 4, teeth is ground by rotating a grindstone 201 formed into a tooth profile while keeping the grindstone in intimate contact with the tooth profile of the external-tooth gear W, and simultaneously by moving the external-tooth gear W in the tooth trace direction (the direction perpendicular to the plane of the figure). This step is a basis for the tooth finish process, and the pitch accuracy and tooth profile accuracy are secured in this step. At this time, roughness and waviness remains in the tooth profile direction of tooth surfaces, as illustrated in FIG. 5.

Next, thus the second step of polishing is carried out.

In this step, as shown in FIG. 1, firstly the film polishing member 110 is placed so as to surround the outer periphery of the external-tooth gear W, and then the film polishing member 110 is pressed against tooth surfaces of the external-tooth gear W with a constant pressure P using shoes 120 by actuating the constant-pressure pressing unit 130.

Then, in that state, the external-tooth gear W is rotated intermittently or continuously in the clockwise and counter-clockwise directions (the external-tooth gear and the film polishing member are made to slide relative to each other). Consequently, tooth surfaces are polished in the tooth profile direction by the film polishing member 110. At this time, provision of a minute vibration (oscillation) for the external-tooth gear W in the trace direction promotes the polishing effect on tooth surfaces.

Figure 6:
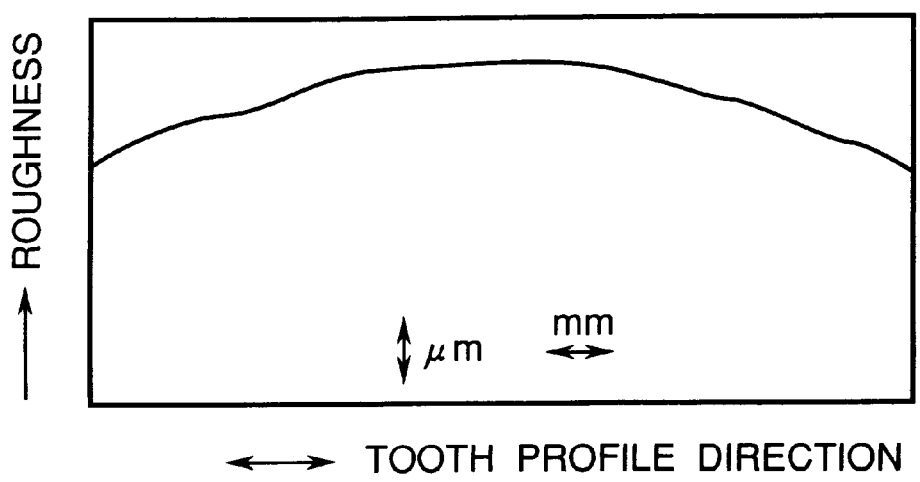
FIG. 6 is a characteristic view of roughness data of a work surface after having carried out the polishing method in accordance of the present invention.

FIG. 6 shows data after the second step. The second step eliminates the waviness and roughness in the tooth profile direction, which were present in the first step.

The film polishing member 110 is advanced (pulled) by a predetermined amount at the stage where a polishing has been carried out for a predetermined time period, at the stage where the external-tooth gear W has been polished by a predetermined angle, or at the stage where a predetermined number of teeth have been polished, so as to polish the gear with new surfaces of the film polishing member.

In polishing, it is essential only that the external-tooth gear W and the film polishing member 110 slide relative to each other, and hence the present polishing apparatus may be constructed, for example, so that the film polishing member 110 is advanced (pulled) while the external-tooth gear W is oscillating only in the tooth trace direction.

In this manner, roughness and waviness of the external-tooth gear W in the tooth profile direction are removed and thus surface roughness is improved, which permits the realization of fluid lubrication between teeth of the external-tooth gear W and outer pins 11 (corresponding to teeth of the inner-tooth gear; see FIGS. 7 and 8) which make a rolling contact accompanied with sliding while moving in the tooth profile direction. Consequently, since an appropriate oil film becomes easy to be secured, a seizure becomes difficult to occur even if the gap between teeth is narrowed, and an angular backlash can also be reduced.

Furthermore, since surface roughness in the tooth profile direction is improved, primarily noises due to sliding or rolling are reduced, and dynamic loads of the outer pins 11 and the external-tooth gears 5a and 5b (the external-tooth gears W) are reduced, which provides an increase in substantial contact ratio, as well as an further decrease in noise generation.

As described above, in accordance with the present invention, since surface roughness of tooth surfaces of the external-tooth gear in the tooth profile direction can be improved, it is possible to realize the reduction in noise generation associated with the meshing of teeth of the external-tooth gear and the securing of oil film by fluid lubrication at contact surfaces. Accordingly, it is possible to narrow the gap between teeth while suppressing seizure of tooth surfaces, which also contributes to a reduction in noises. In addition, angular backlash can also be decreased.

While there has been described what are at present considered to be a preferred embodiment of the invention, it will be understood that various modifications may be made thereto, and it is intended that appended claims cover all such modification as fall within the true spirit and scope of the invention.

What is claimed is:

1. A method for polishing an external-tooth gear, wherein teeth of said external-tooth gear and a film polishing member are made to slide relative to each other in a tooth profile direction while said film polishing member is pressed against tooth surfaces of said external-tooth gear by backing up with a pressing member, so that said tooth surfaces is press-polished.

2. The method for polishing an external-tooth gear according to claim 1, wherein the press-polishing in the tooth profile direction using said film polishing member is executed after said external-tooth gear has been polished in a tooth trace direction with a formed grindstone.

3. The method for polishing an external-tooth gear according to claim 1, wherein the teeth of said external-tooth gear are further oscillated relative to said film polishing member in a tooth trace direction, when the press-polishing in the tooth profile direction using said film polishing member is executed.

4. The method for polishing an external-tooth gear according to claim 1, wherein a pressing surface of said pressing member is formed into a convex curved surface having a smaller curvature than that of a concave curved surface of a tooth profile of said external-tooth gear, and wherein said film polishing member is pressed against the tooth surfaces of said external-tooth gear through said convex curved surface.

5. The method for polishing an external-tooth gear according to claim 1, wherein said film polishing member is made capable of advancing and retreating in a radial direction relative to a center of axis of the external-tooth gear and wherein said external-tooth gear is rotated about the center of axis thereof, so that teeth of the external-tooth gear to be polished is made to slide relative to the film polishing member in the tooth profile direction.

6. An apparatus for polishing an external-tooth gear, comprising:
   a film polishing member for polishing tooth surfaces of said external-tooth gear;
   a pressing mechanism for pressing said film polishing member against the tooth surfaces with a predetermined pressure, said pressing mechanism having a pressing member capable of advancing and retreating relative to a center of axis of said external-tooth gear in a radial direction; and
   a polishing driving mechanism for making slide teeth of said external-tooth gear and said film polishing member relative to each other in a tooth profile direction.

7. The apparatus for polishing an external-tooth gear according to claim 6, further comprising:
   an oscillation mechanism for making teeth of said external-tooth gear oscillate relative to said film polishing member in a tooth trace direction.

* * * * *